US005737418A

United States Patent [19]

Saffari et al.

[11] Patent Number: 5,737,418
[45] Date of Patent: Apr. 7, 1998

[54] ENCRYPTION OF BILL VALIDATION DATA

[75] Inventors: Ali M. Saffari; James P. Hunt, both of Reno, Nev.

[73] Assignee: International Game Technology, Reno, Nev.

[21] Appl. No.: 453,269

[22] Filed: May 30, 1995

[51] Int. Cl.[6] .................. H04L 9/00; H04K 1/00; H04K 1/02; G06F 7/04; G07D 7/00

[52] U.S. Cl. .................. 380/9; 380/4; 380/23; 380/49; 340/825.33; 340/825.34; 340/825.35; 194/205; 194/206; 194/207; 194/210; 194/211; 194/212; 194/213

[58] Field of Search .................. 380/4, 9, 23, 49; 194/205, 206, 207, 210, 211, 212, 213; 340/33, 34, 35

[56] References Cited

U.S. PATENT DOCUMENTS

| | | | |
|---|---|---|---|
| 2,731,621 | 1/1956 | Sontheimer | 194/207 |
| 3,509,535 | 4/1970 | Berube | 194/206 |
| 3,782,543 | 1/1974 | Martelli et al. | 209/75 |
| 3,990,558 | 11/1976 | Ehrat | 194/4 R |
| 4,074,079 | 2/1978 | Prell et al. | 179/6.3 |
| 4,183,085 | 1/1980 | Roberts et al. | 364/200 |
| 4,281,215 | 7/1981 | Atalla | 380/24 |
| 4,315,101 | 2/1982 | Atalla | 380/24 |
| 4,467,139 | 8/1984 | Mollier | 380/23 |
| 4,504,052 | 3/1985 | Murck et al. | 271/9 |
| 4,556,140 | 12/1985 | Okada | 194/4 |
| 4,649,266 | 3/1987 | Eckert | 380/23 |
| 4,853,962 | 8/1989 | Brockman | 380/44 |
| 5,014,325 | 5/1991 | Moritomo | 382/7 |
| 5,076,441 | 12/1991 | Gerlier | 209/534 |
| 5,096,038 | 3/1992 | Potter et al. | 194/210 |
| 5,197,094 | 3/1993 | Tillery et al. | 379/91 |
| 5,236,072 | 8/1993 | Cargill | 194/207 |
| 5,311,595 | 5/1994 | Bjerrum et al. | 380/25 |
| 5,317,636 | 5/1994 | Vizcaino | 380/23 |
| 5,325,434 | 6/1994 | Spaanderman et al. | 380/45 |
| 5,343,529 | 8/1994 | Goldfine et al. | 380/23 |
| 5,363,448 | 11/1994 | Koopman, Jr. et al. | 380/23 |
| 5,379,344 | 1/1995 | Larsson et al. | 380/23 |
| 5,416,307 | 5/1995 | Danek et al. | 235/449 |
| 5,417,316 | 5/1995 | Harbaugh | 194/206 |
| 5,429,361 | 7/1995 | Raven et al. | 273/138 |
| 5,451,759 | 9/1995 | Hoshino et al. | 235/449 |
| 5,473,147 | 12/1995 | Hoshino et al. | 235/449 |
| 5,555,304 | 9/1996 | Hasebe et al. | 380/4 |
| 5,615,760 | 4/1997 | Vaks | 194/206 |
| 5,635,696 | 6/1997 | Dabrowski | 235/449 |
| 5,640,463 | 6/1997 | Csulits | 382/135 |
| 5,662,201 | 9/1997 | Gerlier et al. | 194/206 |
| 5,662,202 | 9/1997 | Suris | 194/206 |

*Primary Examiner*—Thomas H. Tarcza
*Assistant Examiner*—Hrayr A. Sayadian
*Attorney, Agent, or Firm*—Hickman Beyer & Weaver, LLP

[57] ABSTRACT

A method for encrypting bill validation data generated by a bill validator is disclosed. Such data includes an inserted bill's denomination and country of origin as determined by sensors in the bill validator. Once such information is obtained, it is encrypted by combination with an encryption key selected from a table of such keys. The encrypted data is then communicated to a machine associated with the bill validator such as a gaming or vending machine. Upon receipt, the machine decrypts the data to obtain the original bill validation data. If the machine finds the denomination and issuing country of the inserted bill to be acceptable, the machine instructs the bill validator to accept the bill and store it in a bill repository.

21 Claims, 12 Drawing Sheets

| | | | | | | | |
|---|---|---|---|---|---|---|---|
| OFFH | OE5H | d7AH | O67H | F3H | OE1H | O77H | O66H |
| OFOH | OE8H | O74H | O63H | OF2H | OEBH | O7CH | O65H |

| CODE VALUE | COUNTRY |
|---|---|
| 0 | RESERVE FOR STATUS REPORTING |
| 1 | ARGENTINA |
| 2 | AUSTRALIA |
| 3 | BELGIUM |
| 4 | BRAZIL |
| 5 | CANADA |
| 6 | CYPRUS |
| 7 | DENMARK |
| 8 | FRANCE |
| 9 | GERMANY |
| 10 | GREAT BRITAIN |
| 11 | GIBRALTAR |
| 12 | GREECE |
| 13 | HUNGARY |
| 14 | IRELAND |
| 15 | ITALY |
| 16 | MALTA |
| 17 | MEXICO |
| 18 | MOROCCO |
| 19 | NORWAY |
| 20 | PORTUGAL |
| 21 | SPAIN |
| 22 | SWEDEN |
| 23 | UNITED STATES |

FIG. 5A

| CODE VALUE | DENOMINATION |
|---|---|
| 0 | 1 |
| 1 | 5 |
| 2 | 10 |
| 3 | 20 |
| 4 | 25 |
| 5 | 50 |
| 6 | 100 |
| 7 | 200 |
| 8 | 500 |
| 9 | 1000 |
| 10 | 2000 |
| 11 | 5000 |
| 12 | 10000 |
| 13 | 20000 |
| 14 | 50000 |
| 15 | 100000 |

FIG.5B

ENCRYPTION OF BILL VALIDATION DATA

BACKGROUND OF THE INVENTION

This invention relates to encrypted communications between bill validators and the machines employing such bill validators. More specifically, the invention relates to bill validators and protocols they employ to send encrypted bill validation data to associated machine logic.

Many machines which provide goods or services—such as vending machines and gaming machines—contain a "bill acceptor" into which a user inserts currency. The typical bill acceptor first validates and then stores inserted currency in a secure location. A part of the bill acceptor known as a bill validator evaluates inserted bills and makes a preliminary determination as to whether the bill should be accepted or returned to a user. To this end, an item inserted into a bill acceptor must meet certain criteria to be accepted. By way of example, the item must have the markings and dimensions of a recognized, valid, non-counterfeit bill. If it does not, the bill validator will automatically reject it.

As standard bill validators are made for many different markets and applications, they are generally designed to recognize as valid some bills that are not appropriate for all machines. For example, a bill validator may be designed for applications throughout North America, and therefore recognize and accept Canadian, Mexican, and U.S. currency. Such bill validator will not automatically reject valid currency from any of these countries. However, if such bill validator is used in a vending machine located in Denver Colorado, the machine should reject all but U.S. currency. To ensure this result, bill validators are designed to communicate with other parts of a machine which have the necessary logic to determine which of the many bills that a bill validator finds acceptable are, in fact, acceptable to the machine as a whole.

Thus, some bill validators employ standard communication formats to transmit bill validation data to other parts of a machine. One such format requires that specific types of bill validation data be provided at specific locations in a signal, and that such signal be transmitted only under certain conditions. For example, the bill validation data may be arranged such that a code for the inserted currency's denomination ($1, $10, $20, etc.) is provided at one location in a signal and a code for the currency's country (Canada, Mexico, U.S., etc.) is specified at another location in the signal. Upon receiving a communication having this format, the appropriate machine logic then determines whether the inserted bill should be accepted or rejected, and instructs the bill validator to act accordingly.

Bill validators must generally be secure mechanisms. Unfortunately, the protocols employed in validator-machine communications as well as the signal format used in such communications are becoming increasingly well known. Armed with such knowledge, an industry competitor or a thief could tamper with the bill validator or machine logic to defeat a machine's security. Thus, it would be desirable to have a bill validator and/or bill validator-machine system that is as flexible as current systems, but provides additional security.

SUMMARY OF THE INVENTION

The present invention provides a method and system for encrypting bill validation data and sending that encrypted data from a bill validator to machine logic. The machine logic then decrypts the encrypted data, decides whether to accept or reject the bill, and relays its decision back to the bill validator. It has been recognized that this process is necessary because communications of bill validation data to machine logic may be intercepted and decoded in order to defeat a machine's security. By encrypting the bill validation data sent to the machine logic, a competitor or thief with access to a bill validator is unlikely to be able to reverse engineer the system for encoding bill validation data.

The expression "bill validation data" will be used throughout this document. As used herein, bill validation data refers generally to any information pertaining to a bill. Such information typically includes the bill's denomination and country or origin. However, it might also include such information as the magnetic content of the bill, and the markings on the bill including any images or ink type color.

One aspect of the present invention provides a method of validating currency in a currency accepting machine. The method can be generally characterized as including the following steps: (a) upon receipt of a bill in the currency accepting machine, generating a raw bill validation signal containing raw bill validation data, (b) encrypting the raw bill validation data in the bill validation signal to produce an encrypted bill validation signal, (c) communicating that encrypted bill validation signal to a machine which provides credit for goods or services (e.g., a gaming or vending machine), and (d) decrypting the encrypted bill validation signal to retrieve the raw bill validation data. The machine will then determine whether to accept or reject the bill based upon the raw bill validation data it obtains by decrypting.

In preferred embodiments of this invention, the bill validation data is encrypted by a method that involves the following steps: (a) using "previous" bill validation data for a bill that was previously accepted by the bill validator as an independent data source, (b) using an algorithm that employs at least three independent sources of data to select a new encryption key from among a group of available encryption keys, and (c) combining the new encryption key and the raw bill validation data to produce encrypted bill validation data. Three sources of data that have been found useful in selecting new encryption keys include the "previous" bill validation data, the previous encryption key, and the number of bills that have been accepted since a defined event. Regardless of how the encryption key is obtained, it is combined with the raw bill validation data by an XOR logical operation to produce an encrypted signal.

Another aspect of the invention is directed to a bill acceptor that can be characterized as having the following elements: (1) a detector which detects certain physical data pertaining to a bill, (2) a CPU coupled to the detector to receive the physical data, determine the bill's denomination, and determine whether the bill is valid, and (3) an interface for transmitting bill validation signals to a location outside of the bill acceptor. The CPU will include a memory and a processor which are adapted to (a) generate signals containing raw bill validation data including data codifying the bill's denomination, and (b) encrypt the raw bill validation data generated by the generator to produce an encrypted bill validation signal. The detector may take various forms and will typically detect signals from various sources. By way of example, the detector may include one or more light sensors for detecting the light energy transmitted through and/or reflected off the bill. In addition, the detector may include a magnetic field sensor for detecting magnetic fields emanating from the bill.

To encrypt the bill validation data, the bill acceptor may include a table of key words including a pointer which moves to key words in the table in accordance with a specified algorithm. Preferably, the CPU combines the raw bill validation data with a key word selected from the table of key words to produce the encrypted bill validation signal by an exclusive OR operation.

These and other features of the present invention will be presented in more detail in the following detailed description of the invention and the associated figures.

BRIEF DESCRIPTION OF THE DRAWINGS

FIG. 5A is diagram of a country code table suitable for use with the present invention.

FIG. 5B is diagram of a denomination code table suitable for use with the present invention.

DESCRIPTION OF THE PREFERRED EMBODIMENTS

1. Physical Embodiment

The invention employs various process steps involving data stored in computing systems. These steps are those requiring physical manipulation of physical quantities. Usually, though not necessarily, these quantities take the form of electrical, magnetic, or optical signals capable of being stored, transferred, combined, compared, and otherwise manipulated. It is sometimes convenient, principally for reasons of common usage, to refer to these signals as bits, values, elements, characters, data structures, or the like. It should be remembered, however, that all of these and similar terms are associated with the appropriate physical quantities and are merely convenient labels applied to these quantities.

Further, the manipulations performed are often referred to in terms, such as incrementing, encrypting, or combining. In any of the operations described herein that form part of the present invention, these operations are machine operations. Useful machines for performing the operations of the present invention include digital computing systems or other similar devices. In all cases, there should be borne in mind the distinction between the method of operations in operating a digital processor and the method of computation itself. The present invention relates to method steps for operating a digital processor in processing electrical or other physical signals to generate other desired physical signals.

The present invention also relates to an apparatus for performing these operations. This apparatus may be specially constructed for the required purposes, or it may be a general purpose bill validation system selectively activated or reconfigured by a computer program stored in the system. The processes presented herein are not inherently related to any particular bill validation system or other apparatus. In particular, various general purpose machines may be used with programs written in accordance with the teachings herein, or it may be more convenient to construct a more specialized apparatus to perform the required method steps. The required structure for a variety of these machines will appear from the description given below.

Figure 1:
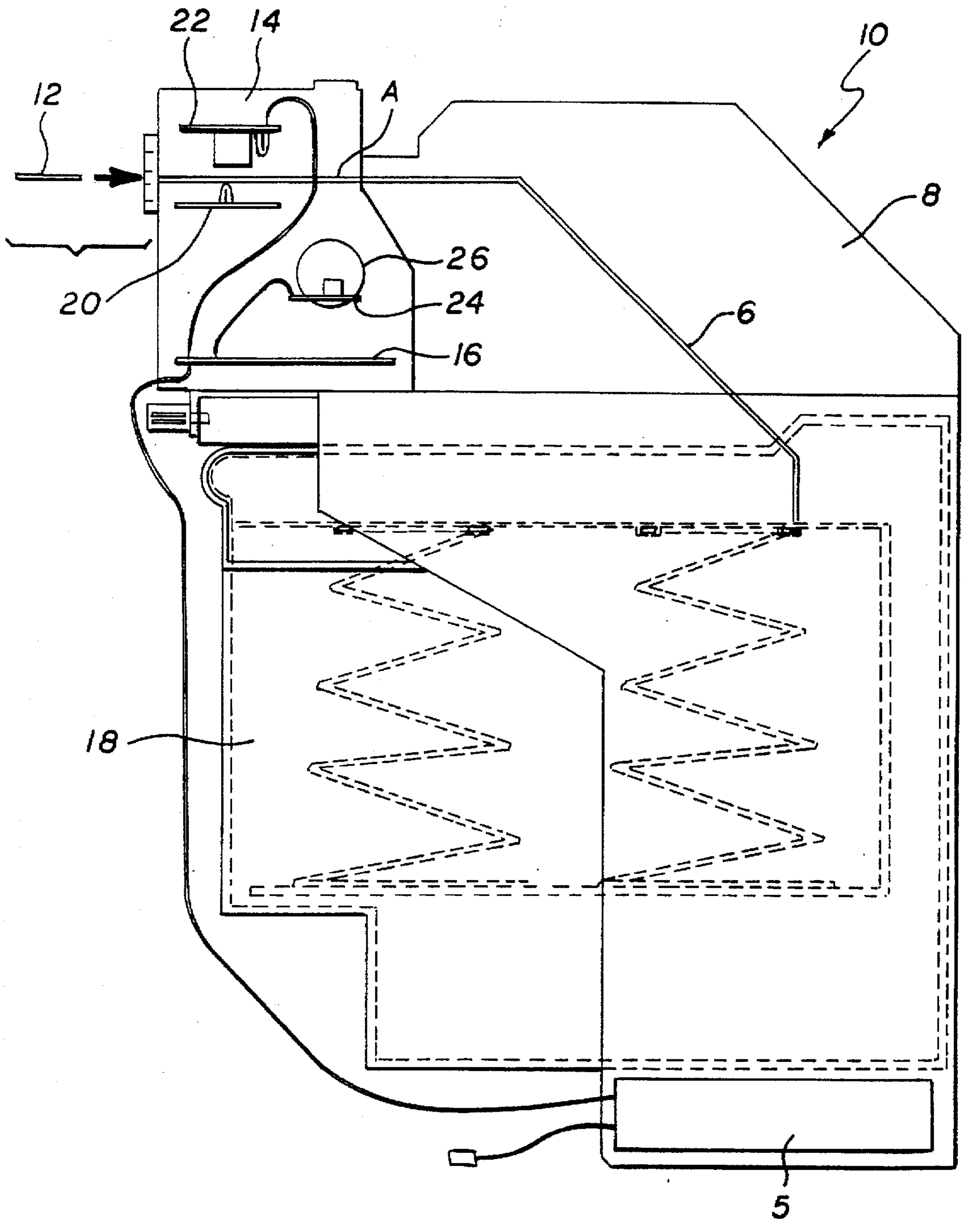
FIG. 1 is a diagram illustrating the primary components of a bill acceptor suitable for use with the present invention.

One implementation for the bill validation protocol of this invention is in an improved bill acceptor provided in a host machine. By way of example, a representative bill acceptor is illustrated in FIG. 1. As seen therein, a bill acceptor 10 includes a bill validator 14, a feed mechanism 8, and a bill repository (or "bill stacker") 18. The bill validator 14 is positioned to accept an inserted bill 12, and contains the detectors, data, and logic required to implement much of the present invention. Many makes and models of bill validators are commercially available, and may be used with the present invention in either unmodified or slightly modified states. By way of example, bill validation heads are available from a number of sources including Rowe International of Whippany, N.J., Japan Cash Machine Co., LTD. of Osaka, Japan, Mars Electronics, Inc. of West Chester, Pa., and Dixie Narco, Inc. of East Lake, Ohio.

The bill validator 14 shown in FIG. 1 includes an LED board 20 which shines light onto a bill 12 after it has been inserted into the validator. Light transmitted through bill 12 is detected by light sensitive sensors on a sensor board 22. In addition, the sensor board 22 may have its own light sources which shine light onto the bill 12 and detect some of that light which is reflected back onto its own light sensitive sensors. The intensity of the transmitted and reflected light is employed to ascertain any printed patterns on the bill 12. In addition to the light sensitive sensors, the sensor board 22 may also include a magnetism sensor to detect magnetic fields emanating from magnetic ink used on some currency. Additional bill data may be obtained from an encoder sensor 24 which monitors the revolutions of a motor 26 employed to move the bill 12 through the validator. This data is used to determine the length of inserted bill 12.

Data from the board 22 and sensor 24 is transmitted to a CPU board 16 which includes the necessary processors and memory to (1) make an initial determination of whether bill 12 is valid, and (2) control the encoding and encrypting of bill validation data provided by the sensors 22 and 24. Regarding the initial determination, a "valid" bill is one that is bona fide and non-counterfeit as determined by criteria of the bill validator 14. This determination is made without regard to the bill's denomination and country of origin. It is quite possible that a bill deemed valid by the validator 14 still will be rejected because the machine with which the bill validator is used determines that the bill's denomination or country of origin is unacceptable. Regarding the CPU board's encoding and encrypting functions, the board's memory will store tabular data specifying codes for a bill's denomination and issuing country. In addition, the memory will include an encryption key table which is described in detail below. Still further, the memory will include processor instructions for generating and encrypting validation data signals for use by the associated machine. The processor will, of course, act on these instructions to generate the appropriate signals. Such signals are communicated from bill validator 14 to the machine through an interface 5 (which is usually provided with an associated power supply for the bill validator).

After bill 12 passes by sensor board 22, it comes to rest with its tailing edge at position A, out of the user's reach. A bill at this location is said to be in an "escrow position." It is important to note that from the escrow position, the bill validator may either return the bill to the user or irretrievably stack the bill in a repository 18. This invention is primarily concerned with a protocol for determining whether to return bill from the escrow position or irretrievably stack it. Assuming that the bill validator 14, in conjunction with its associated machine, determines that bill 12 should be accepted, the bill is then transported along bill path 6 in feed mechanism 8 to the bill repository 18 where it is irretrievably held until the repository is removed from the bill acceptor 10.

Regarding the bill repository (or stacker) 18, some applications, such as gaming industry applications, require that the bill repository 18 to take the form of a secure cash box. It may also include a stacking mechanism to ensure that the bills are stacked in an orderly manner.

The host machine may be any of a number of possible machines which (1) provide credit to a user when the user inserts currency, and (2) dispense goods or services when the user issues appropriate instructions. By way of example, the host machine may be a gaming machine such as a slot machine or video poker machine, a vending machine such as a soda machine, a candy machine, or a cigarette machine, or an arcade game such as a video arcade game. In each instance, the host machine has a "crediting mechanism" or "machine logic" which makes the decision of whether to accept or reject an inserted bill and give a user credit for an accepted bill. As mentioned, the machine logic receives bill validation data from the bill validator 14 through interface 5. Thereafter, the machine transmits acceptance or rejection of a bill back through the interface to the bill validator. The machine logic will generally include a CPU having one or more processors and memory. The memory will store relevant instructions for using a key table to decrypt encrypted signals from the bill validator 14.

2. Bill Validation Data Formats

In accordance with the present invention, bill validation data for an inserted bill is converted to a binary data pulse sequence of specified format. This sequence is then encrypted and communicated to specialized logic in a machine. Upon receipt of the encrypted sequence, the machine logic decrypts it and uses it to determine whether to accept the inserted bill.

Figure 2A:
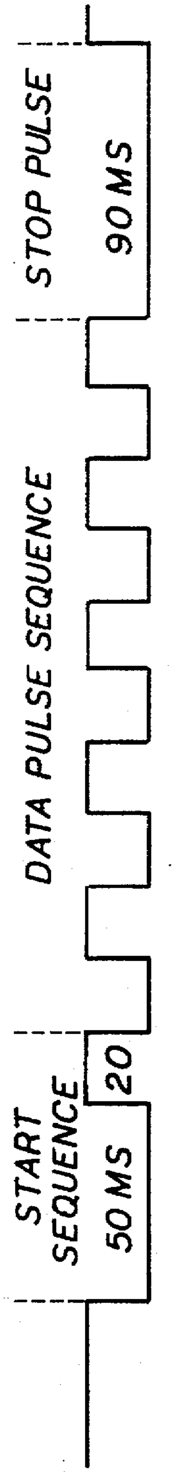
FIG. 2A is a generic representation of an event message signal.
Figure 2B:
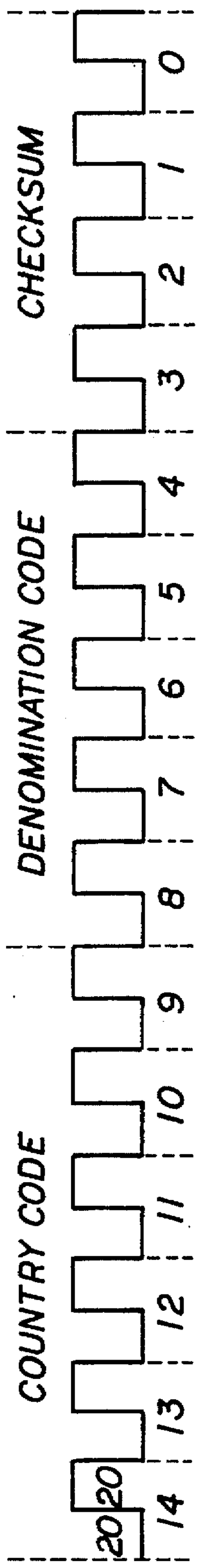
FIG. 2B is a generic representation of the data pulse sequence portion of the signal shown in FIG. 2A
Figure 2C:
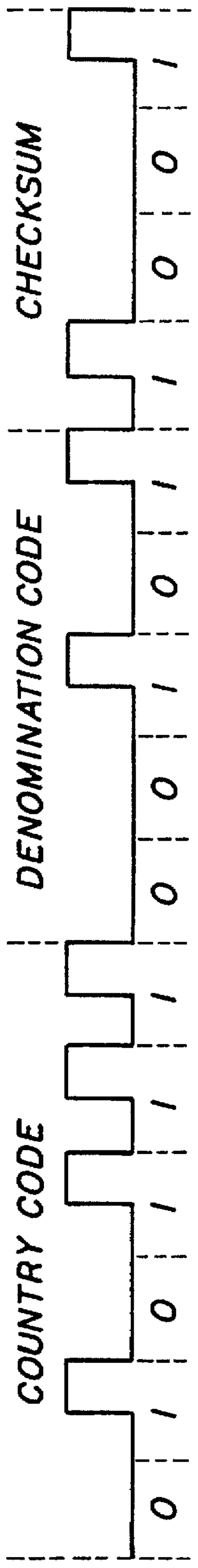
FIG. 2C is a specific representation of the data pulse sequence shown in FIG. 2B.

An exemplary format for communicating binary bill validation data is illustrated in FIGS. 2A–2C. Upon receiving a bill, the bill validator issues an "event report" in the form of a signal having the arrangement shown in FIG. 2A. The event report includes a "start sequence" shown as having a 50 millisecond low pulse followed by a 20 millisecond high pulse. Upon receiving this start sequence, the machine will be in a state to receive bill validation data. The data is provided as a binary "data pulse sequence" of a defined length and following the start sequence as shown in FIG. 2A. At the conclusion of the data pulse sequence, the event report includes a stop pulse shown as a 90 millisecond low pulse. Of course, event reports may have other formats so long as both the bill validator and the machine logic understand the format's features. By way of example, the start and stop sequences may include high and/or low pulses of varying lengths and combinations.

In the example shown in FIG. 2B, the data pulse sequence is further divided into three fields: a 6 bit country code, followed by a 5 bit denomination code, and concluded with a 4 bit checksum. As used herein, the country code end of the sequence will be referred to as the "most significant" end and the checksum end will be referred to as the "least significant" end. It should be understood that the size of the various fields used in this example could vary depending upon the number of possible countries or denominations handled by the machine. For example, if there were only 16 possible countries whose currency could be accepted, a 4 bit country code field would suffice, but if there were up to 64 possible countries, then a 6 bit country code field would be required. In addition, the data pulse sequence could contain other combinations of information. For example, it might include an additional field for another bill parameter or, it might have fewer fields if, for example, the bill validator recognized only one country's currency.

To obtain the binary values for the country code and denomination code fields, country code and denomination code tables are consulted. Exemplary versions of such tables are shown in FIGS. 5A and 5B and (and discussed in more detail below). Basically, the values corresponding to the country and denomination of the inserted currency are picked off these tables and converted to binary sequences for use in the country code and denomination code fields of the data pulse sequence. For example, such tables might specify that the denominations 1, 5, 10, 20, 25, and 50 have the numerical values 0, 1, 2, 3, 4, and 5 respectively, while the countries Argentina, Canada, Mexico, and the U.S. might have the numerical values 1, 5, 17, and 23 respectively. A bill validator reading a fifty dollar bill from the U.S. would generate a signal having the binary value of 23 in the country code field of the signal and the binary value of 5 in the denomination code field. As shown in the example of FIG. 2C, the country code has a binary value of 010111 (23), and the denomination code has a binary value of 00101 (5).

The checksum at the least significant end of the data pulse sequence is obtained by summing the binary 1's in the coventry code and denomination code fields (giving a value of 6 in this example), converting this number to a binary value (0110), and performing a 1's complement (1001). As known to those of skill in the signal processing arts, a checksum is commonly employed to help ensure to that data sequences have not been corrupted by noise or tampering during transmission.

Figure 3:
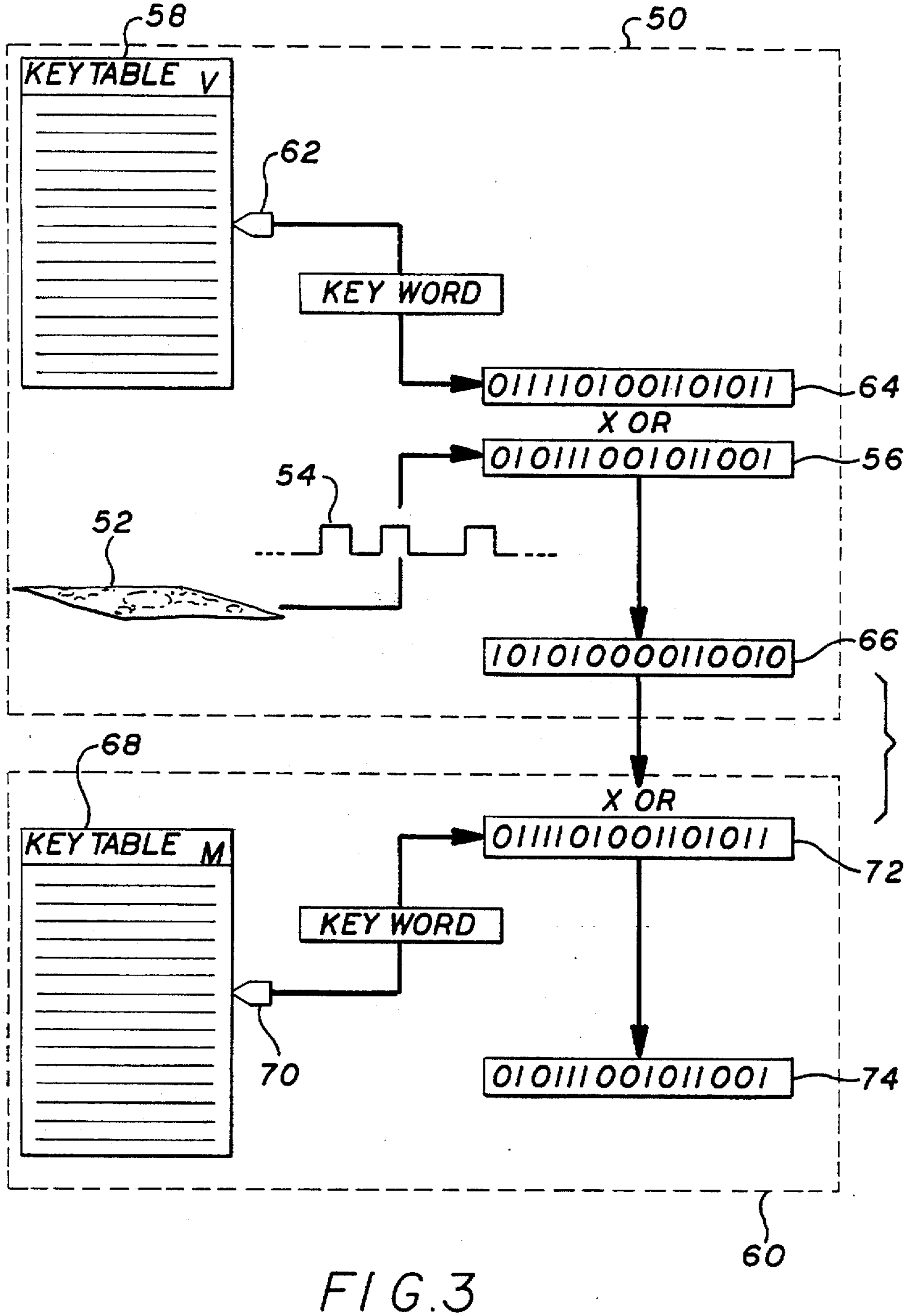
FIG. 3 is a diagram illustrating the encryption and decryption procedures used in the present invention.

One process for encrypting and decrypting bill validation data is illustrated in FIG. 3. The system shown in this example includes a bill validator unit 50 and a logic unit 60 for a machine requiring bill validation. Initially, the bill validator 50 detects information contained on an inserted bill 52 to generate a data pulse sequence 54. The data pulse sequence 54 is illustrated as a 15 bit binary sequence 56 having a country code field, a denomination code field, and a checksum as described above. The 15 bit binary value 56 is combined with a 16 bit key word 64 by an exclusive OR logic operation. The key word 64 is taken from a key table 58 stored in the bill validator. A pointer 62 determines which specific key word from key table 58 is to be combined with the binary sequence 56 by the exclusive OR logic operation. As explained below, the pointer 62 moves throughout key table 58 according to a specified algorithm chosen to make reverse engineering difficult. It should be noted that, in this example, the key word 64 contains 16 bits while the sequence containing the bill validation data contains only 15 bits. Thus, before the exclusive OR operation is performed, one of the terminal bits must be truncated from the key word. In this example, the bit at the most significant end (the left end) of key word 64 is deleted.

The exclusive OR logic operation generates a binary value 66 which is provided as an encrypted data pulse sequence. This sequence is communicated as an event message (described above) to machine 60 where it is decrypted by combination with a key word 72. Key word 72 is picked off of a key word table 68 (stored in machine 60) which contains the same entries as key word table 58 in the bill validator 50. In addition, key word table 68 includes a pointer 70 which move about the table according to the same algorithm employed to move pointer 62 about key table 58. Thus, the particular key word 64 used to encrypt data pulse sequence 54 is also used (as key word 72) to decrypt the data pulse sequence. To regenerate the original data pulse sequence (decrypted data pulse sequence 74), the encrypted data pulse sequence 66 is combined with key word 72 by an exclusive OR logic operation. As can be seen, the two successive exclusive OR logic operations performed with same key word serve to first encrypt and then regenerate the original data pulse sequence 56. Thus, the bit sequence in decrypted data 74 is identical to the bit sequence in raw data 56.

After decryption, the machine 60 will evaluate decrypted data pulse sequence 74 to determine if its checksum (i.e., the least significant 4 bits) agrees with the remainder of the sequence. If so, the machine 60 also determines whether the denomination code and country code of sequence 74 specifies a bill which should be accepted. If so, the machine 60 will instruct bill validator 50 to accept bill 52.

3. Process Details

A preferred embodiment of the invention will now be described with reference to process flow diagrams in FIGS. 4–9. In the discussion of these diagrams, each process and decision step will be indicated with either a "V" representing an action taken by the bill validator or a "G" representing an action taken by a gaming machine or other machine associated with the bill validator. It should be understood that bill validators of this invention may be employed with gaming machines, vending machines, or any other system that must act on bill validation data.

Figure 4A:
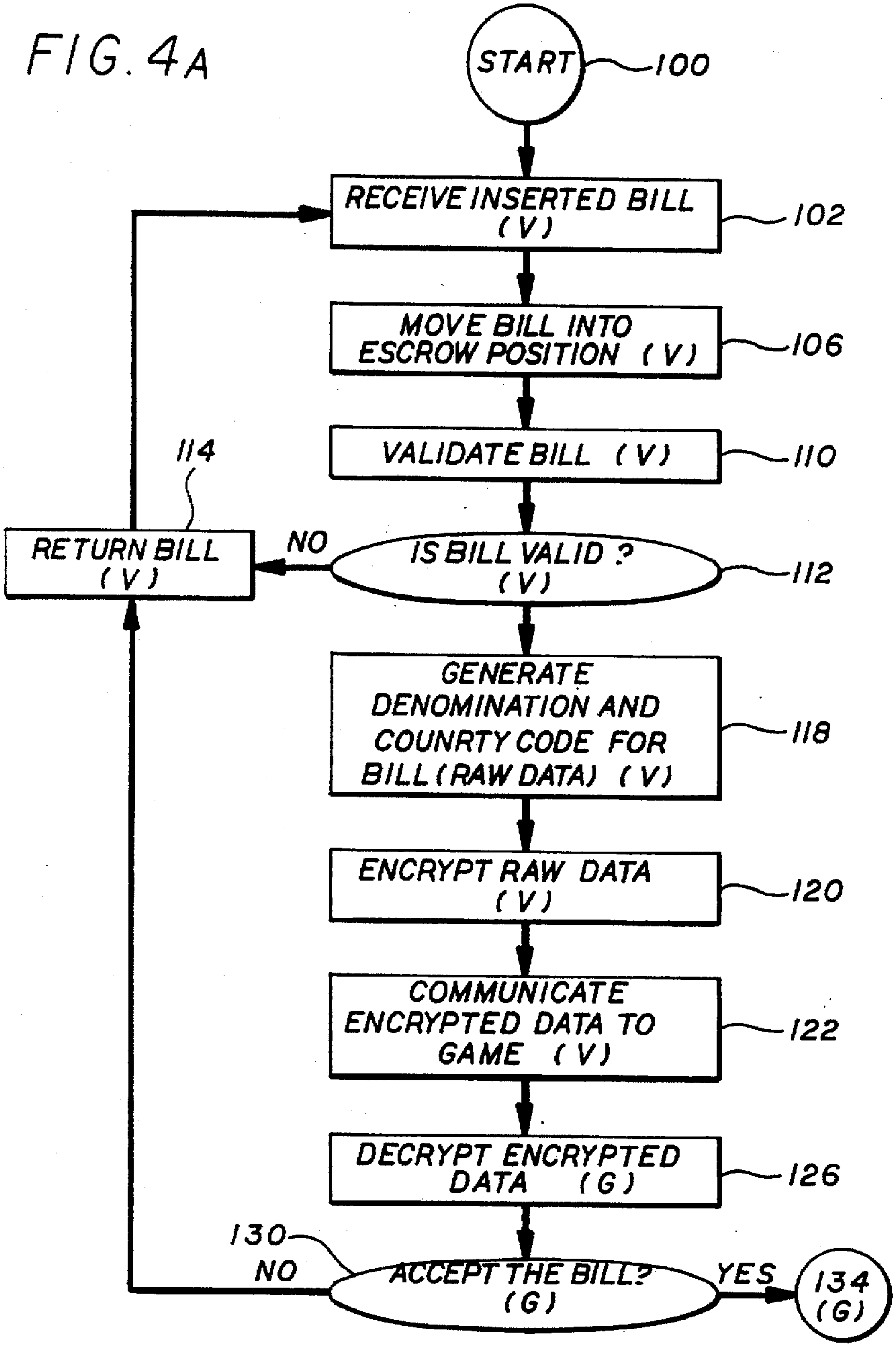
FIG. 4A and 4B are together a process flow diagram setting forth the primary steps employed in a bill validation protocol of the present invention.
Figures 4B, 6A:
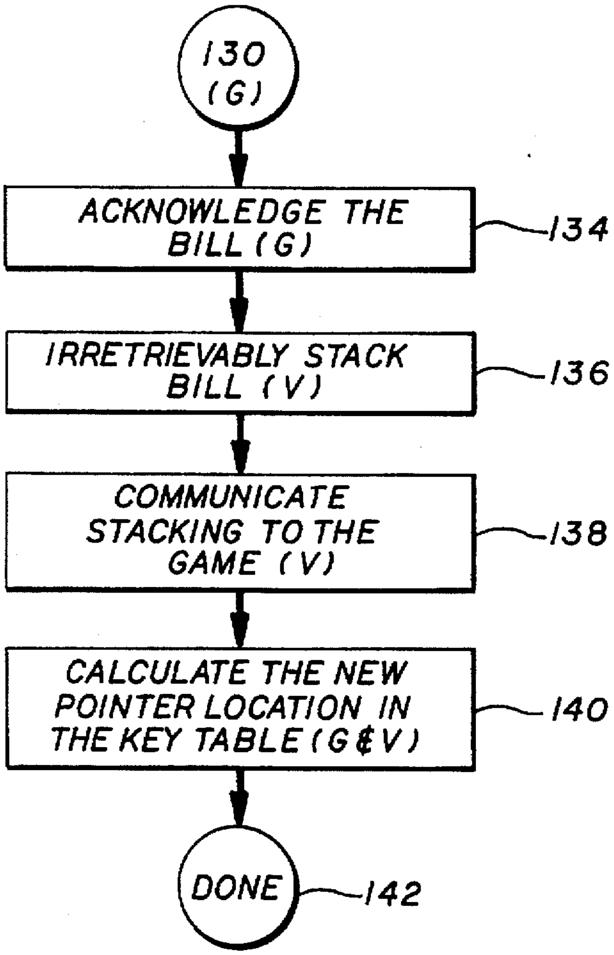
FIG. 6A is a diagram of an encryption key table suitable for use with present invention.

Referring initially to FIGS. 4A and 4B, the principal steps employed in the process are presented. The process begins at 100 and in a step 102, a bill is inserted into the bill validator. Thereafter, at a process step 106, the bill validator moves the bill into an escrow position within the validator. As explained above, a bill moved into the escrow position is out of reach of a user but, not irretrievably stored in a cash box.

After the bill has been moved into the escrow position, the bill validator "validates" the bill to ensure that it is not counterfeit, etc., at a step 110. Based on the information gathered at step 110, the bill validator decides, at a decision step 112, whether the inserted bill is or is not valid. Assuming that it determines that the bill is not valid—e.g., it is counterfeit—the bill validator returns the bill at a step 114. Thereafter, process control returns to a point before process step 102 where the system awaits insertion of a new bill. Most commercially available bill validators provide some mechanism for validating bills. As noted, such bill validators are available from, for example, Japan Cash Machine Co., LTD, Mars Electronics, Inc., Dixie Narco, Inc., etc.

Assuming that the bill validator determines that the bill is, in fact, valid at step 112, it then generates a denomination code and a country code (the "raw data") at a process step 118. This step will be described in more detail with reference to FIG. 5. Next, the bill validator encrypts the raw data at a step 120, and then communicates that encrypted data to the logic for the gaming machine at a step 122. Thereafter, the gaming machine logic decrypts the data at 126 and determines whether to accept the bill at a decision step 130. The machine logic will decide to reject a bill if its denomination or country code does not meet the machine's requirements. In addition, the machine may decide to reject a bill for other reasons. By way of example, a user may have exceeded a preset maximum credit limit. It should be apparent from the above discussion that the bill validator may determine that a particular bill is valid (at decision step 112) but nevertheless refuse to accept that bill because the machine logic has found it unacceptable (at decision step 130).

Assuming that decision step 130 is answered in the negative, the bill validator returns the bill at process step 114. If, on the other hand, decision step 130 determines that the inserted bill is acceptable, the machine logic acknowledges the bill by sending an appropriate message to the bill validator at a process step 134. The bill validator then irretrievably stacks the bill at a step 136 and communicates the stacking to the game at a step 138. Before concluding the procedure, the bill validator and the game concurrently identify, at a step 140, an encryption key to be used when the next bill is inserted into the bill validator. The process is then concluded at 142. Process step 140 will be described in more detail with reference to FIG. 8 below.

Figure 5:
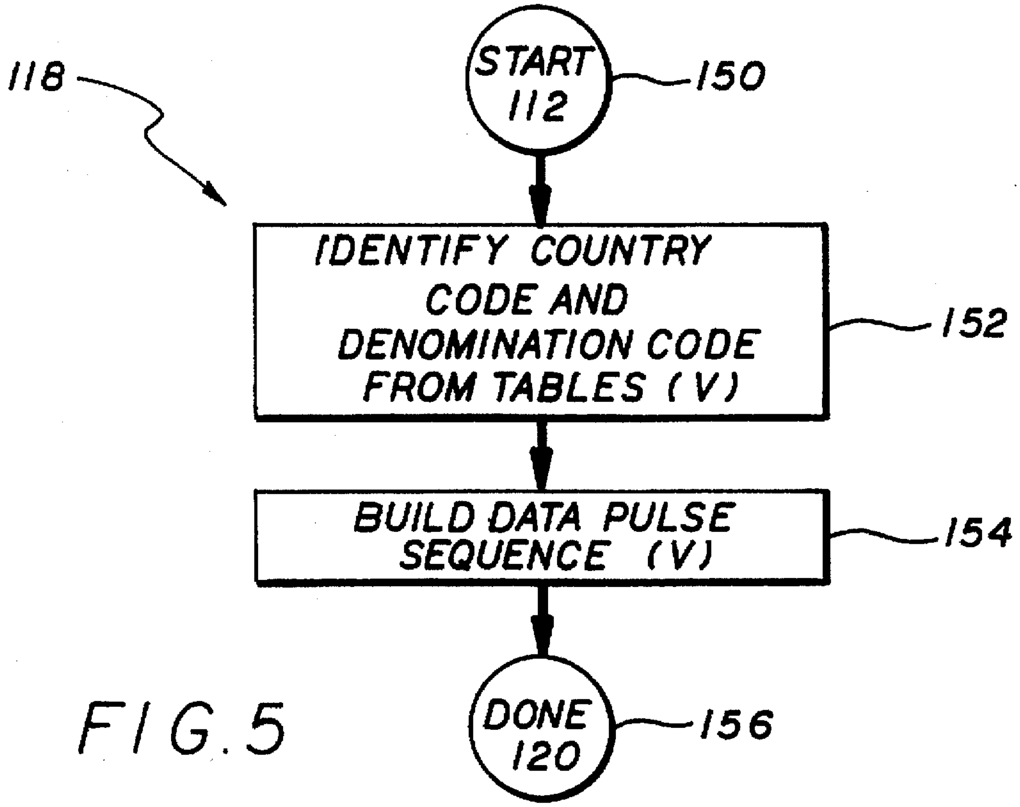
FIG. 5 is a process flow diagram illustrating the process steps employed to generate raw data used in a bill validation event message.
Figure 6:
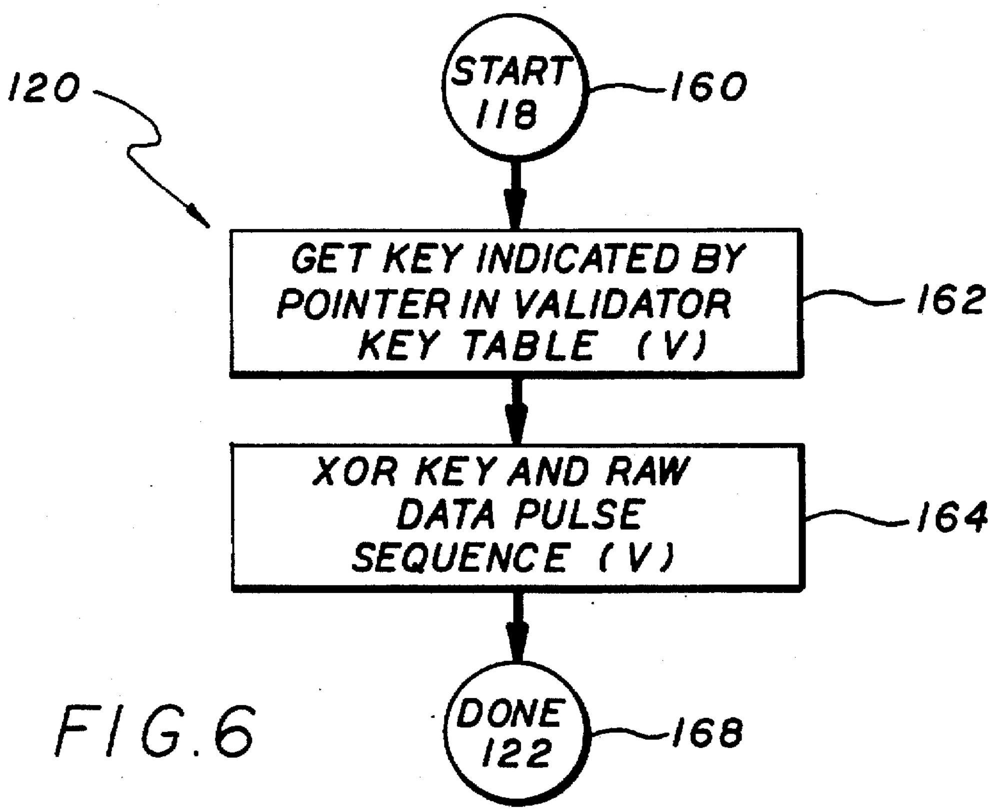
FIG. 6 is a process flow diagram presenting the principal process steps employed in an encryption technique suitable for use with the present invention.

FIG. 5 is a process flow diagram illustrating the principle steps employed in the process of generating raw bill validation data (i.e., step 118 of FIG. 4A). The process begins at 150 and then a process step 152 identifies the country code and denomination code from appropriate tables residing in the system's memory. FIGS. 5A and 5B present exemplary country code and denomination tables. Next, the bill validator builds a data pulse sequence at a step 154 including the country code and denomination code that it identified at step 152. Thereafter, the process is concluded at 156.

This process is further illustrated with reference to FIGS. 5A, 5B, and 2C. Assume that the bill validator determines that the inserted bill is a U.S. fifty dollar bill at step 110 of FIG. 4A. First, the bill validator identifies a country code value for the United States from the table presented in FIG. 5A. As shown there, the United States has a corresponding country code value of 23, or, in binary format, 010111. As explained above and shown in FIG. 2C, the country code is provided in a 6 bit field which has been given the binary value 01011 corresponding to the U.S. country code. The denomination table shown in FIG. 5B is consulted to identify the numeric code value corresponding to a denomination of 50. As shown, the code value for this denomination is 5 which has a corresponding binary representation of 00101. As shown in FIG. 2C, the denomination code is provided in a 5 bit field which, in this example, has been given the binary value of 00101. Finally, as discussed above with reference to FIG. 2C, the data pulse sequence is provided with a checksum which is 1001 (for a complete data pulse sequence of 01011100101001).

After the raw data pulse sequence has been generated at step 118 (FIG. 4A), that sequence is encrypted at step 120 as mentioned above. Further details of the encryption process are now provided with reference to FIG. 6. The process begins at 160, and in a step 162, a key word is obtained from a list of key words. The specific key is identified by the location of a pointer which is recalculated after each new bill is accepted (The recalculation process will be described in more detail below with reference to FIGS. 8 and 9.) As shown in FIG. 6A, the list of keys is provided as a series of 8 bit values (in hexadecimal notation).

After the appropriate key word has been selected at step 162, a process step 164 combines that key word with the data pulse sequence by an exclusive OR logic operation ("XOR"). Specifically, the data sequence and the key word are combined as shown in FIG. 3 and discussed above. The process is then completed at 168.

Figure 7:
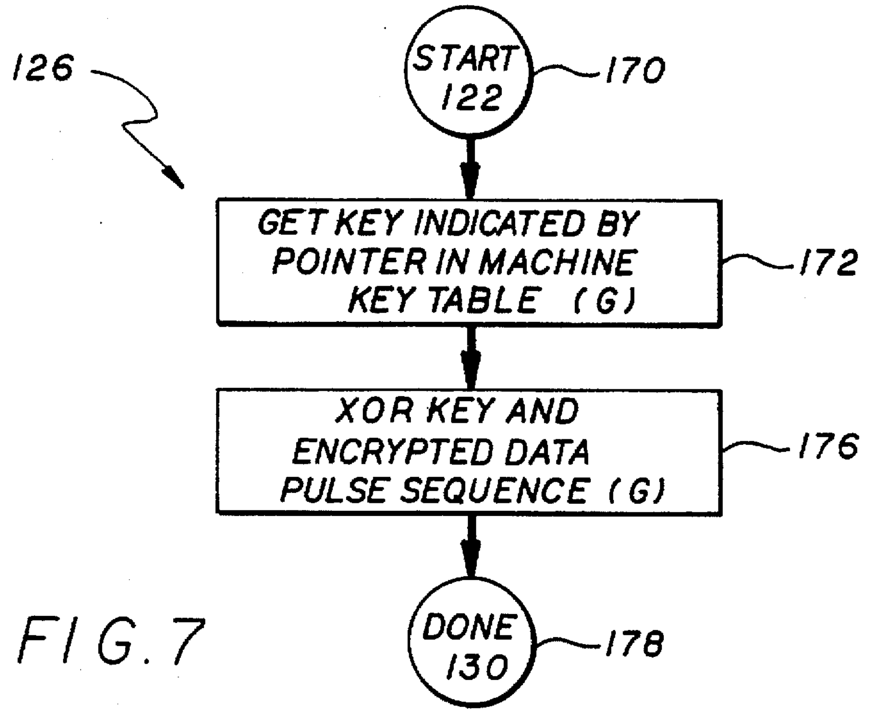
FIG. 7 is a process flow diagram illustrating the principal process steps employed in an encryption protocol suitable for use with the present invention.

FIG. 7 details the process of decrypting data sent from the bill validator to another part of the machine (i.e., step 126 of FIG. 4A). The process begins at 170 and then, in a process step 172, a key word is retrieved from a table of key words stored in the machine. As noted in the discussion of FIG. 3, the machine key table entries should be identical to the bill validator key table entries. In addition, the algorithm used to move the pointer among the key words of the machine table should be identical to the algorithm used to move the pointer in the bill validator table. Thus, at any given time, the pointers in both the bill validator and the gaming machine will point to the same key word. Next, in process step 176, the encrypted data pulse sequence is combined with the selected key word by a logical XOR operation (see FIG. 3). This will decrypt the encrypted data pulse sequence and return the original raw data including country code, denomination code, and checksum. The process is then completed at 178. It should be noted, that if the checksum provides an incorrect value, the machine will decide to reject the bill at decision step 130 as shown in FIG. 4A.

In a preferred embodiment, after the machine decides to accept or reject the inserted bill, that decision is communicated to the bill validator in the following manner. If the machine determines that the country code, checksum, etc. are acceptable, it will acknowledge the bill validator's message (i.e., decision step 130 is answered in the affirmative and process step 134 is performed). If on the other hand, the game determines that there is some problem with the data sequence from the bill validator, it will not acknowledge the message. Rather than giving up, the bill validator will then resend the bill validation message. If it is still not acknowledged, it will return the bill to the player as indicated at process step 114.

Figure 8:
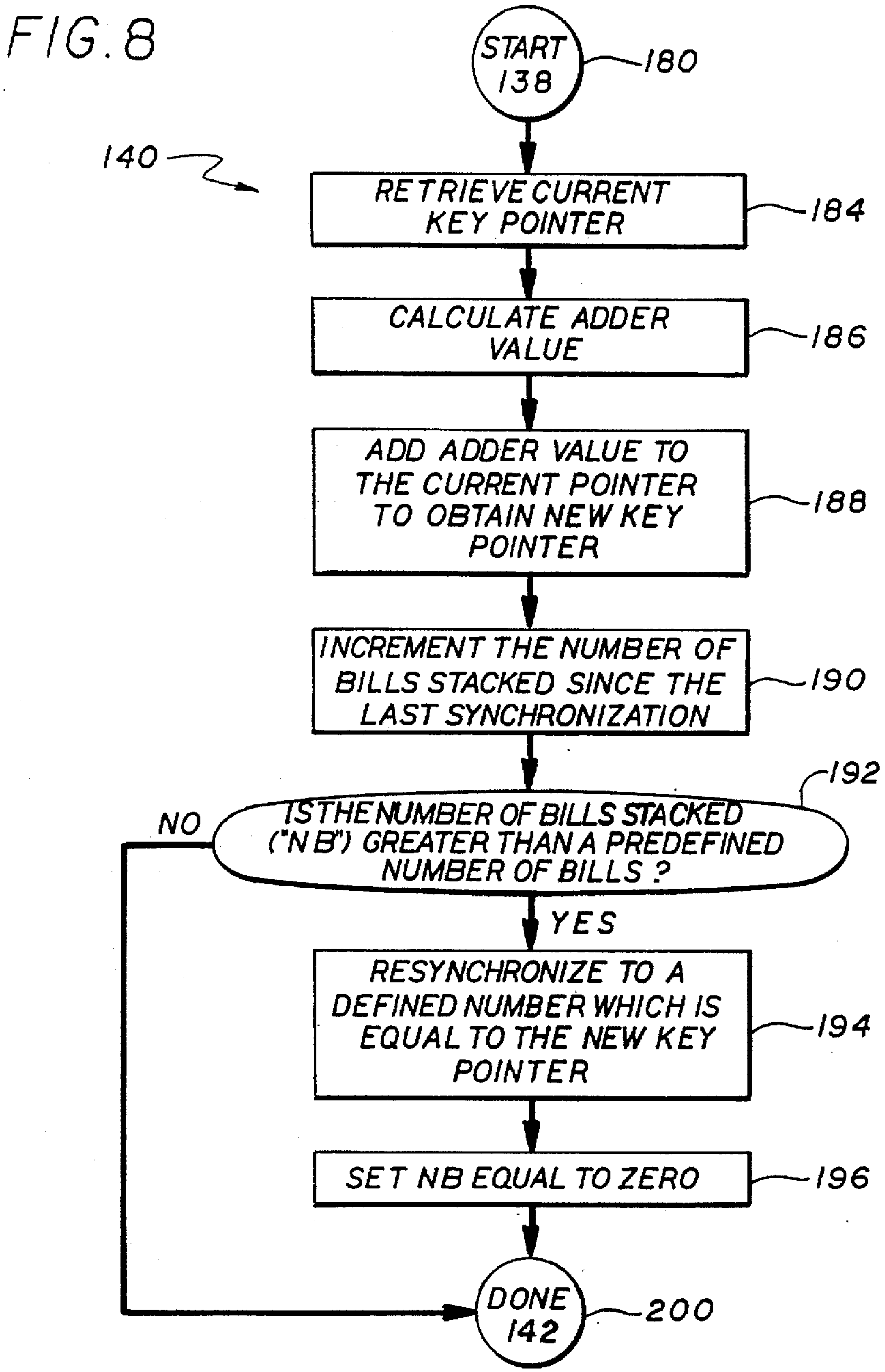
FIG. 8 is a process flow diagram showing the principal steps employed to determine a new pointer location in a key table in accordance with one embodiment of this invention.

As noted, it is necessary to move the pointers to a new key word each time a bill has been accepted and irretrievably stacked. This makes decryption difficult for anyone who does not know the protocol for selecting a new key word. FIG. 8 details the process employed to select a new key word after a bill has been accepted (corresponding to process step 140 of FIG. 4B). The process begins at 180, and in process step 184, the pointer to the current key is retrieved. Next, a process step 186 calculates a new "adder" value. This value is then added to the current key pointer location to obtain a new key pointer location at a step 188. This new key pointer location specifies a key word that will be used to encrypt the data pulse sequence for the next bill that is inserted into the bill validator.

After the adder value has been determined at step 188, a step 190 increments the number of bills stacked since synchronization (discussed below). This value is referred to as "NB" herein. If three bills have been stacked since last synchronization, then NB should be equal to 3. Next, a decision step 192 determines whether the number of bills stacked "NB" is greater than a predefined number of bills. If not, the process is concluded at 200. If, on the other hand, NB is greater than this predefined number, then the system is resynchronized such that the new key pointer is set to a defined number (e.g., 1) at a step 194. In addition, at a step 196, the value of NB is reset to 0. Thereafter, the process is concluded at 200. It should be understood that the process of FIG. 8 is performed concurrently on both the machine logic and the bill validator logic. This ensures that the same key word will be used to encrypt and decrypt a given signal.

Many techniques are acceptable for calculating the adder values described above, but, in general, the chosen technique should be difficult to reverse engineer. It is known that algorithms using at least three independent sources of information tend to become unpredictable or chaotic. In the example presented in FIGS. 9A and 9B, three independent sources are employed in the adder calculation algorithm. These are (1) the raw validation data (country and denomination codes), (2) the encryption key, and (3) NB (i.e., the number of bills accepted since the last synchronization).

Figure 9A:
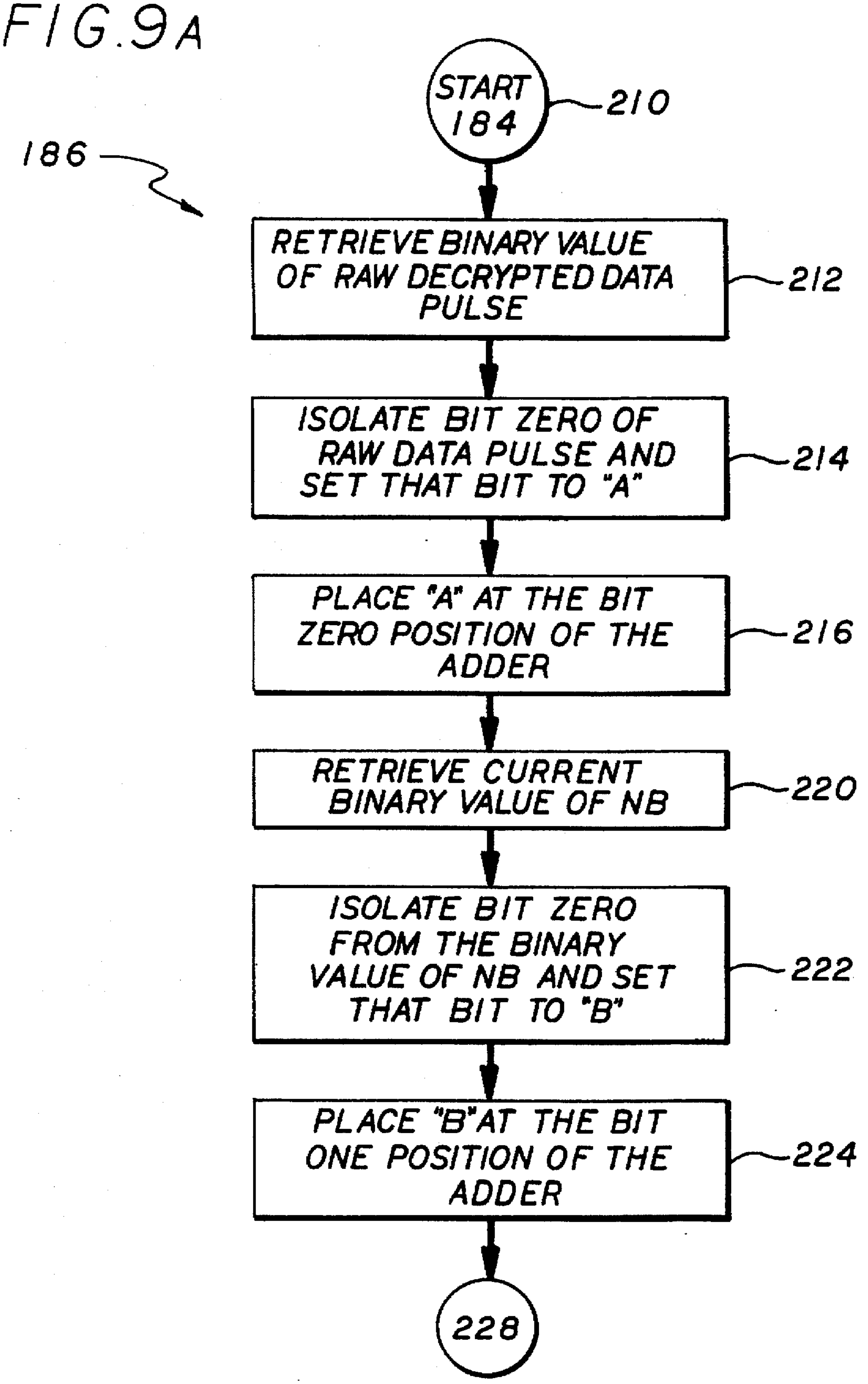
FIGS. 9A and 9B are together a process flow diagram presenting the steps employed to generate a pointer offset according to a specific embodiment of the present invention.
Figure 9B:
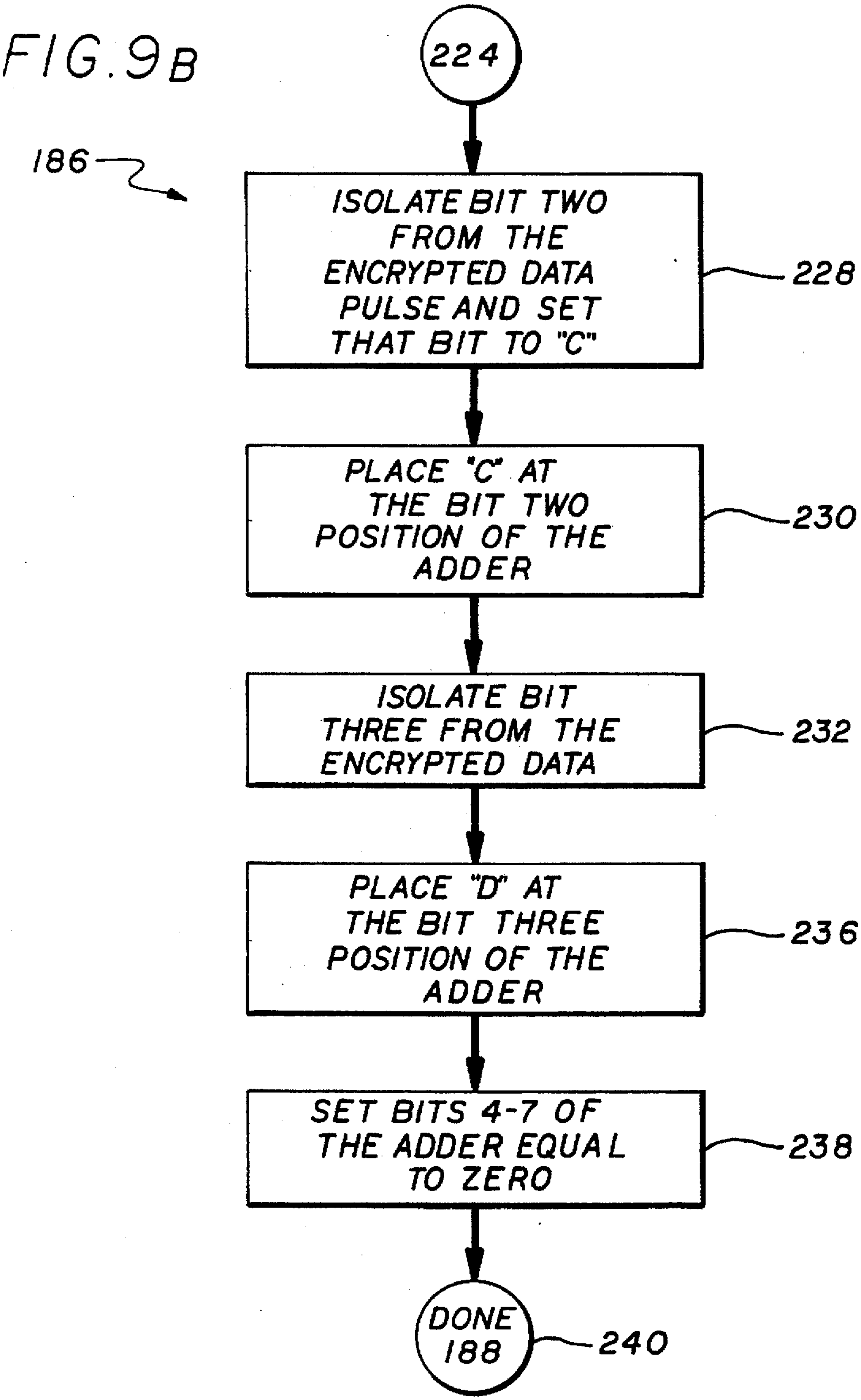

FIGS. 9A and 9B detail a preferred embodiment for calculating the adder value (step 186 of FIG. 8). In the embodiment described here, the adder value takes the form of an eight bit value. The process begins at 210, and in a process step 212, the raw binary value of the decrypted data pulse is retrieved. Thereafter, at a step 214, bit 0 (the least significant bit) of the raw data pulse is set equal to a value A. Next, the value of A is provided as bit 0 of the adder at a step 216. To obtain the next bit of the adder (bit 1), the current binary value of NB is retrieved at a step 220. From this binary value, bit 0 is isolated and set to the value B at a step 222. The value of B is then provided as bit 1 of the adder at a step 224. Next, bit number 2 of the encrypted data pulse is isolated and designated as C at a step 228. Then, at a step 230, bit 2 of the adder is set to the value of C. Thereafter, at a step 232, bit number 3 of the encrypted data pulse is isolated and designated as D. Then, bit 3 of the adder is given the value of D at a step 236. Finally, bits 4–7 of the adder are said equal to 0 at a step 238 and the process is concluded at 240.

4. Examples

Bill Validation Protocol

The following example illustrates a specific implementation of this invention's protocol for sending and receiving event report messages in a bill transaction. This example describes a two way pulsed based communication protocol, with handshaking, employing the following two physical communication paths: (1) an "Enable/Disable" signal which is the input to a triac which switches an AC signal, during zero crossings, from the machine to the bill validator, and (2) a Vend/Status signal which is a DC signal from the bill validator to the machine.

In general, the communication protocol consists of a series of messages involving handshaking for verification of receipt of messages. There are three message types used in this example: (1) event reports sent from the validator to the machine and to convey either a bill transaction or validator status, (2) toggling sent from the machine to the validator to indicate that the machine has verified receipt of the event report, and (3) stacked messages sent from the validator to the machine once the bill has been "irretrievably" stacked. In the case of a bill transaction, toggling specifically indicates that the machine wishes to accept the bill for credit and informs the validator to stack the bill.

Figure 10:
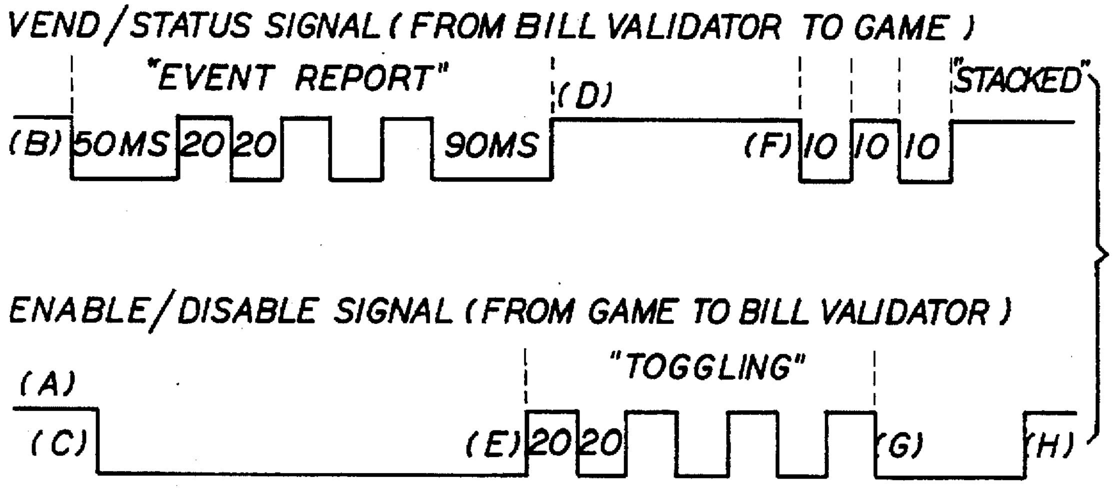
FIG. 10 is a diagram showing a sequence of signal transitions employed in bill validation in accordance with one embodiment of this invention.

Referring now to FIG. 10, the machine initially asserts an Enable/Disable signal, at time (A), to enable the bill validator. Thereafter, a bank note is inserted into the bill validator. The note is validated, and the bill validator initiates the bill transaction by sending the event report message on the Vend/Status signal to the machine at time (B). The message consists of a sequence of pulses in the following format, a start pulse sequence followed by a data pulse sequence followed by a single stop pulse. The data pulse sequence represents a bit coded country and denomination value to convert the bill's value into the correct number of credits.

The machine negates the Enable/Disable signal within 10 milliseconds of the first transaction of the start sequence, at time (C), thereby disabling the bill validator from further bill transactions until the current transaction has been completed. Upon completion of the event report message, the bill validator asserts the Vend/Status signal, at time (D). This signals the end of the event report message. The machine will then verify the message by decrypting, and calculating a 4 bit 1's complement checksum of the 11 bits making up the country and denomination codes and compare with the decrypted 4 bit checksum received from the bill validator.

If the checksums do not match, the message is declared to be invalid and the machine will not acknowledge receipt of this message. The validator must then wait a minimum of 200 milliseconds before attempting to resend the message. The total number of attempts, including the initial attempt, is three. After three unsuccessful tries, the validator will return the bill to the user. On the third attempt to send the message, the validator will use an encryption key which allows the machine and validator validator to resynchronize. Resynchronization forces the pointers on the key tables of the machine and bill validator to a common prespecified value, e.g. 7.

If the checksums do match, the machine will determine if it is allowed to accept this particular bill by using the country and denomination codes contained within the message. If any one of the codes does not match those of the approved values, as determined by the machine, the message will be declared invalid and no acknowledgment will be sent. If the codes are valid, the machine will acknowledge receipt of the event report message by toggling the Enable/Disable signal at time (E). The toggling takes the form of a 40 millisecond ±5 millisecond, period pulse sequence with a 50 percent duty cycle and must begin within 200 milliseconds from the completion of the bill acceptance message. Note that the toggling specification is for the timing of the input to a triac, which changes state at the zero crossing of the AC signal.

The bill validator will now validate the toggling in a two step process. First, the validator must detect at least three logical transitions in the toggling message. Second, the toggling must begin within 200 milliseconds from the completion of the bill acceptance message, as mentioned above. If either of these conditions are not met, the validator resends the bill message up to three times as described above.

If the bill validator can validate the machine toggling, it will transfer the note to the stacker and into the cash box. When the note is transferred to the stacker, at time (F), the bill validator will send a stacked sequence. This consists of a 10 millisecond, ±1 millisecond, low pulse, a 10 millisecond, ±1 millisecond, high pulse, and another 10 millisecond, ±1 millisecond, low pulse.

If the bill validator does not send the stacked sequence within 8 seconds from the first transition of the toggle, the machine will cease toggling. When the bill validator sends the stacked sequence within the specified time limit, the machine will validate the message by detecting the two logical transitions on the Vend/Status signal. The presence of these transitions is enough to declare the message to be valid. The machine will cease toggling within 6 milliseconds of detecting a valid stacked sequence, at time (G), and will begin crediting the user for the note. The bill validator must not initiate another bill transaction until the current transaction is complete and the machine has reasserted the Enable/Disable signal. Only after the proper amount of credit is given, at time (H), does the machine assert the Enable/Disable signal, thereby reenabling the bill validator for the next bill transaction.

The handshaking protocol employed in this example assures that noise or other types of interference cannot substitute for valid messages. The machine ensures that the bill is completely transferred to the stacker and cannot be retrieved by the user before crediting the user for the note. In addition, the machine will completely credit the note before re-enabling the validator for the next bill transaction.

Encryption

The following example presents an encryption scheme employing a key table which is identical in both the bill validator, and the machine. A key word is XORed with the data pulse sequence and the result is the encrypted data pulse sequence which is sent over the Vend/Status signal. The data is decrypted by calculating the same key word and XORing it with the encrypted data pulse sequence. The result is the original data pulse sequence. The encryption/decryption rules for this example are as follows:

The status message will always use a key word of 0000H. That is the same as not encrypting or decrypting status messages. In some cases, it may desirable to encrypt status messages. If so, an encryption/decryption key word will be selected by an algorithm such as the following.

The key table will be 16 bytes long, and will be identical in the bill validator and the machine. The key is found by using a pointer value to point to a location in the key table. The two bytes at the pointer value are the most significant byte and the least significant byte of the key word, respectively. The pointer value is incremented by an eight bit adder value "X" after each irretrievably stacked pulse. X is derived from the data pulse sequence associated with the stacked message by the following algorithm (corresponding to FIGS. 9A and 9B):

$X_{binary}$=X.7,X.6,X.5,X.4,X.3,X.2,X.1,X.0

X.0=Decrypted Data Pulse Bit 0

X.1=NB Bit 0; NB is the Binary Value of the Number of Bills Stacked since the Pointers were Synchronized X.2=Encrypted Data Pulse Bit 2

X.3=Encrypted Data Pulse Bit 3

X.4=X.5=X.6=X.7=0

The following points apply in the encryption algorithm.

1. The number of bills stacked since the pointers were synchronized (NB) is kept independently by the bill validator and the machine.

2. The pointer is synchronized to 1 on power up. The pointer value is synchronized to 0 if the value of NB=20, and NB gets reset on any synchronization. The key table must be developed such that any encrypted country code is not 0 (this is reserved for status messages).

3. The key table must be developed such that the country code will always be incorrect if decrypted with an incorrect key.

Although the foregoing invention has been described in some detail for purposes of clarity of understanding, it will be apparent that certain changes and modifications may be practiced within the scope of the appended claims. For instance, although the specification has described currency in the form of bills, other currency forms may be used as well. For example, coins may also be used. In addition, the reader will understand that the encryption protocol described herein can be used in systems other than bill validators. For example, the protocol here taught may be used with credit and debit card validators and their equivalent within the electronic fund transfer arts.

What is claimed is:

1. A method of validating cash currency in a machine that accepts currency and which provides credit for goods or services, the method comprising the following steps:

(a) upon receipt of a bill in said machine, generating a bill validation signal containing raw bill validation data, which validation data includes data codifying the denomination of the currency and data codifying the country of origin of the currency;

(b) encrypting the raw bill validation data in the bill validation signal to produce an encrypted bill validation signal;

(c) communicating the encrypted validation signal to machine logic contained in said machine; and (d) decrypting the encrypted bill validation signal with said machine logic to retrieve the raw bill validation data.

2. The method of claim 1 further comprising a step of determining whether to accept or reject said bill based upon the raw bill validation data obtained by said step of decrypting.

3. The method of claim 2 wherein the bill is received by a bill validator, and wherein the method includes the following steps:

(a) if the bill is to be accepted based upon the raw bill validation data, transmitting a signal acknowledging receipt of the bill to the bill validator; and (b) storing the bill in a bill repository.

4. The method of claim 3 further comprising a step of communicating a signal from the bill validator to the machine logic indicating that the bill has been delivered to the bill repository, after said bill has been stored in the bill repository.

5. The method of claim 1 wherein the machine logic is provided in a machine selected from the group consisting of gaming machines, vending machines, and arcade game machines.

6. A bill acceptor comprising:

(a) a detector for detecting physical data pertaining to a cash bill;

(b) a CPU including at least a memory and a processor, the CPU being coupled to said detector to receive said physical data such that the CPU determines said bill's denomination, country of origin, and whether said bill is valid; and (c) an interface for transmitting signals from the CPU to a location outside of the bill acceptor; wherein said memory and said processor of the CPU (i) generate a signal containing raw bill validation data, which validation data includes data codifying the bill's denomination and data codifying the bill's country of origin, and (ii) encrypt the raw bill validation data, including data codifying the bill's denomination and data codifying the bill's country of origin, to produce an encrypted bill validation signal.

7. The bill acceptor of claim 6 wherein the detector includes one or more light sensors for detecting one or more of (i) light energy transmitted through said bill and (ii) light energy reflected off said bill.

8. The bill acceptor of claim 6 wherein the detector includes a magnetic field sensor for detecting magnetic fields emanating from said bill.

9. The bill acceptor of claim 6 further comprising:

a motor for moving the bill through the bill acceptor; and an encoder sensor to monitor the motor so as to obtain data pertaining to the bill's size.

10. The bill acceptor of claim 6 wherein the memory includes a table of key words which are used to encrypt the raw bill validation data.

11. The bill acceptor of claim 10 wherein the table of key words includes a pointer which moves to key words in the table in accordance with a specified algorithm.

12. The bill acceptor of claim 10 wherein the CPU combines the raw bill validation data with a key word selected from the table of key words to produce the encrypted bill validation signal.

13. The bill acceptor of claim 12 wherein the CPU employs an exclusive OR operation to combine the raw bill validation data with a key word selected from the table of key words.

14. A currency Accepting machine comprising:

(a) a bill acceptor including (1) a detector for detecting physical data pertaining to cash bill, (2) an acceptor CPU including at least a first memory and a first processor, the acceptor CPU being coupled to said detector to receive said physical data such that the acceptor CPU determines said bill's denomination, country of origin, and whether said bill is valid, the first memory and first processor of the acceptor CPU (i) generating a signal containing raw bill validation data including data codifying the bill's denomination and data codifying the bill's country of origin, and (ii) encrypting the raw bill validation data to produce an encrypted bill validation signal;

(b) an interface for transmitting encrypted bill validation data, which validation data includes data codifying the bill's denomination and data codifying the bill's country of origin, to a location outside of the bill acceptor;

(c) a machine CPU coupled to said interface in a manner which allows it to send signals to and receive signals from said bill acceptor, the machine CPU including at least a second memory and a second processor, wherein the machine CPU (i) decrypts the encrypted bill validation signal to obtain said bill validation data, and (ii) determines whether to accept said bill.

15. The currency accepting machine of claim 14 wherein said second CPU is adapted to determine whether to accept said bill based, at least in part, upon the denomination of said bill.

16. The currency accepting machine of claim 14 wherein the first memory includes a first table of key words which are used for encrypting the raw bill validation data, and wherein the second memory includes a second table of key words which are used for decrypting the encrypted bill validation signal, and wherein the first and second tables of key words have identical key words.

17. The currency accepting machine of claim 16 wherein the acceptor CPU combines the raw bill validation data with a key word selected from the first table of key words to produce the encrypted bill validation signal.

18. The currency accepting machine of claim 17 wherein the acceptor CPU employs an exclusive OR operation to combine the raw bill validation data with a selected key word selected from the first table of key words.

19. The currency accepting machine of claim 18 wherein the machine CPU employs an exclusive OR operation to combine the encrypted bill validation signal with the selected key word from the second table of key words.

20. The currency accepting machine of claim 14 wherein the first and second tables of key words include pointers which move to key words in their respective tables in accordance with a specified algorithm.

21. The currency accepting machine of claim 14 wherein the machine is selected from the group consisting of gaming machines, vending machines, and arcade game machines.

* * * * *